US009607553B2

(12) United States Patent
Park

(10) Patent No.: US 9,607,553 B2
(45) Date of Patent: Mar. 28, 2017

(54) ORGANIC LIGHT EMITTING DIODE DISPLAY AND METHOD FOR SENSING DRIVING CHARACTERISTICS THEREOF

(71) Applicant: LG DISPLAY CO., LTD., Seoul (KR)

(72) Inventor: Jiwoong Park, Goyang-Si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/565,138

(22) Filed: Dec. 9, 2014

(65) Prior Publication Data

US 2015/0187278 A1 Jul. 2, 2015

(30) Foreign Application Priority Data

Dec. 26, 2013 (KR) ........................ 10-2013-0164614

(51) Int. Cl.
*G06F 3/038* (2013.01)
*G09G 3/3291* (2016.01)

(52) U.S. Cl.
CPC ... *G09G 3/3291* (2013.01); *G09G 2300/0866* (2013.01); *G09G 2320/02* (2013.01); *G09G 2320/0295* (2013.01); *G09G 2320/04* (2013.01); *G09G 2320/043* (2013.01); *G09G 2320/045* (2013.01); *G09G 2330/025* (2013.01)

(58) Field of Classification Search
CPC .. G09G 3/10; G09G 3/30; G09G 3/36; G09G 5/00; G06F 3/038
See application file for complete search history.

(56) References Cited

U.S. PATENT DOCUMENTS

| | | | | |
|---|---|---|---|---|
| 9,196,192 | B2 * | 11/2015 | Kim | G09G 3/3208 |
| 2006/0221047 | A1 | 10/2006 | Tanizoe et al. | |
| 2009/0140959 | A1 | 6/2009 | Nam et al. | |
| 2010/0188320 | A1 * | 7/2010 | Min | G09G 3/3291 345/80 |
| 2011/0279444 | A1 * | 11/2011 | Chung | G09G 3/3233 345/214 |
| 2013/0050292 | A1 * | 2/2013 | Mizukoshi | G09G 3/3291 345/690 |

(Continued)

FOREIGN PATENT DOCUMENTS

| | | | |
|---|---|---|---|
| CN | 1841161 | A | 10/2006 |
| CN | 101430862 | A | 5/2009 |

(Continued)

*Primary Examiner* — Pegeman Karimi
(74) *Attorney, Agent, or Firm* — Birch, Stewart, Kolasch & Birch, LLP

(57) ABSTRACT

An organic light emitting diode display and a method for sensing driving characteristics thereof are discussed. The organic light emitting diode display supplies a data voltage of an input image to pixels each including an organic light emitting diode in a driving mode and senses changes in driving characteristics of the pixels in a sensing mode. The organic light emitting diode display in one example includes a low potential power voltage adjustment unit configured to reduce a low potential power voltage of the pixels to a negative voltage in the sensing mode and adjust the low potential power voltage to a ground level voltage in the driving mode, and a sensing unit configured to sense an anode voltage of the organic light emitting diode using an analog-to-digital converter in the sensing mode.

17 Claims, 8 Drawing Sheets

(56) References Cited

U.S. PATENT DOCUMENTS

| | | | | |
|---|---|---|---|---|
| 2013/0147694 | A1* | 6/2013 | Kim | G09G 3/32 345/82 |
| 2013/0335366 | A1* | 12/2013 | Lee | G06F 3/044 345/174 |
| 2015/0062137 | A1 | 3/2015 | Yu et al. | |

FOREIGN PATENT DOCUMENTS

| | | | |
|---|---|---|---|
| CN | 103165079 | A | 6/2013 |
| CN | 203311812 | U | 11/2013 |
| KR | 10-2014-0119980 | A | 10/2014 |
| KR | 10-2015-0026039 | A | 3/2015 |
| TW | 201140534 | A1 | 11/2011 |

* cited by examiner (a)

(b)

ORGANIC LIGHT EMITTING DIODE DISPLAY AND METHOD FOR SENSING DRIVING CHARACTERISTICS THEREOF

This application claims the priority benefit of Korean Patent Application No. 10-2013-0164614 filed on Dec. 26, 2013, the entire contents of which is incorporated herein by reference for all purposes as if fully set forth herein.

BACKGROUND OF THE INVENTION

Field of the Invention

Embodiments of the invention relate to an organic light emitting diode display and a method for sensing driving characteristics thereof.

Discussion of the Related Art

Because an organic light emitting diode display is a self-emission display device, the organic light emitting diode display may be manufactured to have lower power consumption and thinner profile than a liquid crystal display requiring a backlight unit. Further, the organic light emitting diode display has advantages of a wide viewing angle and a fast response time. As the development of a process technology reaches a large-sized screen mass production technology, the organic light emitting diode display has expanded its market while competing with the liquid crystal display.

Each of pixels of the organic light emitting diode display includes an organic light emitting diode (OLED) having a self-emitting structure. Organic compound layers including a hole injection layer HIL, a hole transport layer HTL, an emission layer EML, an electron transport layer ETL, an electron injection layer EIL, etc. are stacked between an anode terminal and a cathode terminal of the OLED. The organic light emitting diode display implements an input image using a phenomenon, in which the OLED emits light when electrons and holes are combined in an organic layer through a current flowing in a fluorescence or phosphorescence organic thin film.

The organic light emitting diode display may be variously classified depending on kinds of emission materials, an emission method, an emission structure, a driving method, etc. The organic light emitting diode display may be classified into a fluorescent emission type and a phosphorescent emission type depending on the emission method. Further, the organic light emitting diode display may be classified into a top emission type and a bottom emission type depending on the emission structure. Further, the organic light emitting diode display may be classified into a passive matrix OLED (PMOLED) display and an active matrix OLED (AMOLED) display depending on the driving method.

Each pixel of the organic light emitting diode display includes a driving thin film transistor (TFT) controlling a driving current flowing in the OLED depending on data of the input image. Driving characteristics of the pixels have to be the same as one another at all of locations of the screen. However, the driving characteristics of the pixels may vary depending on the location of the screen due to a process deviation. Further, the driving characteristics of the pixels may vary depending on a driving time and a driving environment. Examples of the driving characteristic of the pixel include a threshold voltage of the OLED, a threshold voltage of the driving TFT, and a mobility of the driving TFT.

An external compensation technology for sensing the driving characteristics of the pixels and compensating for the driving characteristics using a driving circuit outside a display panel has been proposed as a method for increasing the image quality and the lifespan of the organic light emitting diode display.

The external compensation technology senses the driving characteristics of the pixels based on changes in the anode voltage of the OLED or changes in a source voltage of the driving TFT using an analog-to-digital converter (ADC) and modulates data, thereby compensating for changes in the driving characteristics of the pixels. The ADC is designed in consideration of an estimated range of changes in the driving characteristics of the pixels due to the degradation of the driving characteristics, the size of an integrated circuit (IC) in which the ADC is embedded, the sensing accuracy, a sensing scale, and the like. A sensing circuit including the ADC may accurately sense driving characteristic of a pixel, which will be firstly examined, in an initial sensing environment. However, when the driving characteristics of the pixels greatly change because of the elapse of driving time and changes in the driving environment of the pixel, the driving characteristics of the pixels cannot be accurately sensed. This is because output data of the ADC overflows when the changes in the driving characteristics of the pixels are outside the range (hereinafter, referred to as "sensing range") of an input voltage, which can be accurately sensed by the ADC. The ADC outputs all of the voltages exceeding the sensing range as digital data of a maximum value.

For example, when the sensing range of the ADC is 2V and the ADC outputs 10-bit digital data, the ADC converts a range (for example, 1V to 3V) of 2V into digital values of 1024 stages. However, when the anode voltage (or the threshold voltage) of the OLED is 4V, the anode voltage of the OLED exceeds the sensing range of the ADC. Therefore, the ADC outputs the digital data value "1024" corresponding to "2V". As a result, the anode voltage of the OLED is sensed as 2V, and the driving characteristic of the pixel is inaccurately sensed. Accordingly, when changes in the driving characteristic of the pixel exceed the sensing range of the ADC, the driving characteristic of the pixel is inaccurately sensed.

SUMMARY OF THE INVENTION

Embodiments of the invention provide an organic light emitting diode display and a method for sensing driving characteristics thereof capable of sensing changes in driving characteristics of pixels exceeding a sensing range of an analog-to-digital converter (ADC).

In one aspect, there is an organic light emitting diode display, which supplies a data voltage of an input image to pixels each including an organic light emitting diode in a driving mode and senses changes in driving characteristics of the pixels in a sensing mode, comprising a low potential power voltage adjustment unit configured to reduce a low potential power voltage of the pixels to a negative voltage in the sensing mode and adjust the low potential power voltage to a ground level voltage in the driving mode, and a sensing unit configured to sense an anode voltage of the organic light emitting diode using an analog-to-digital converter in the sensing mode.

In another aspect, there is a method for sensing driving characteristics of an organic light emitting diode display, which supplies a data voltage of an input image to pixels each including an organic light emitting diode in a driving mode and senses changes in driving characteristics of the pixels in a sensing mode, the method comprising reducing a low potential power voltage of the pixels to a negative voltage in the sensing mode, adjust the low potential power voltage to a ground level voltage in the driving mode, and sensing an anode voltage of the organic light emitting diode using an analog-to-digital converter in the sensing mode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
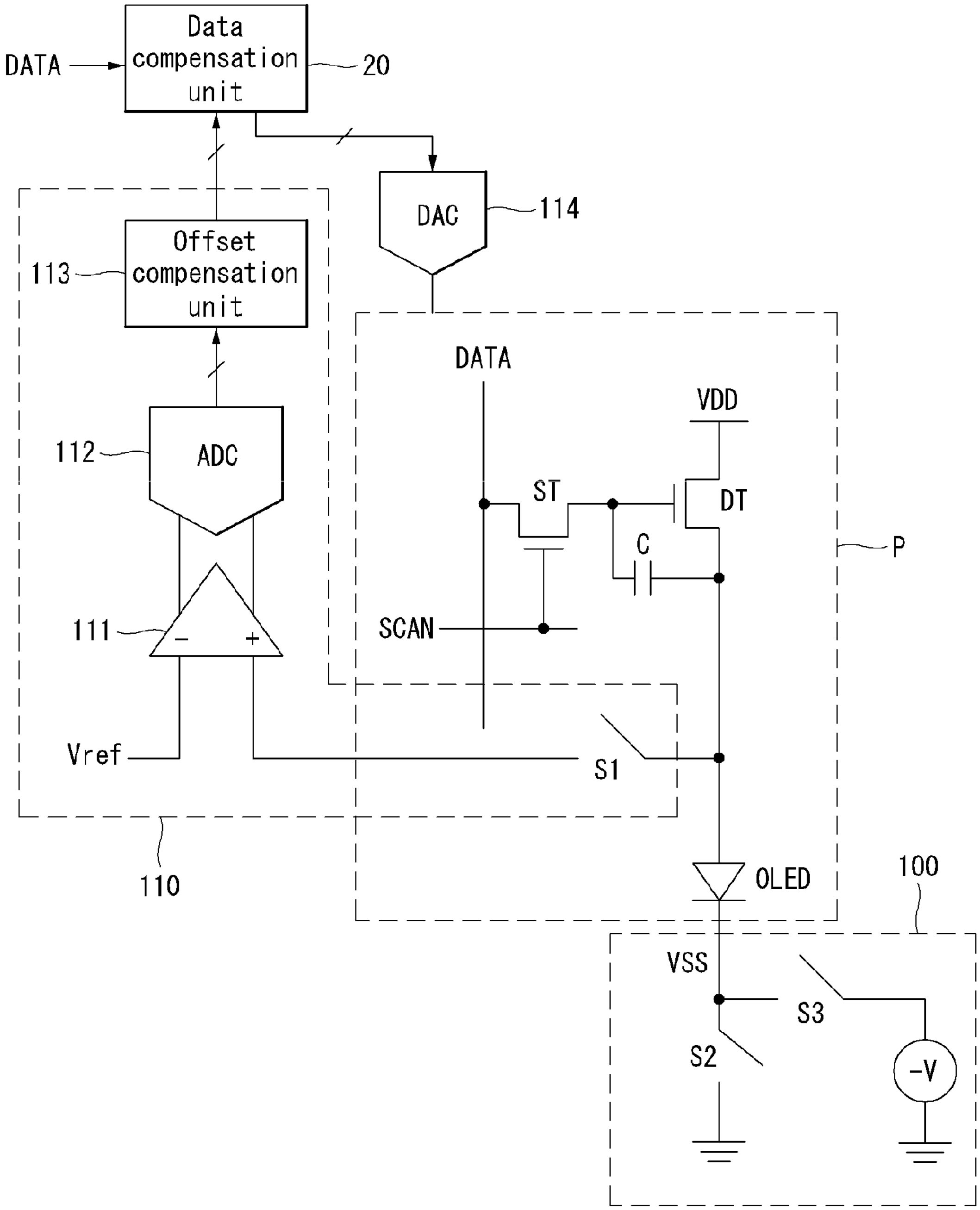
FIG. 1 shows a driving characteristic compensation device in an organic light emitting diode display according to an exemplary embodiment of the invention.
Figure 9:
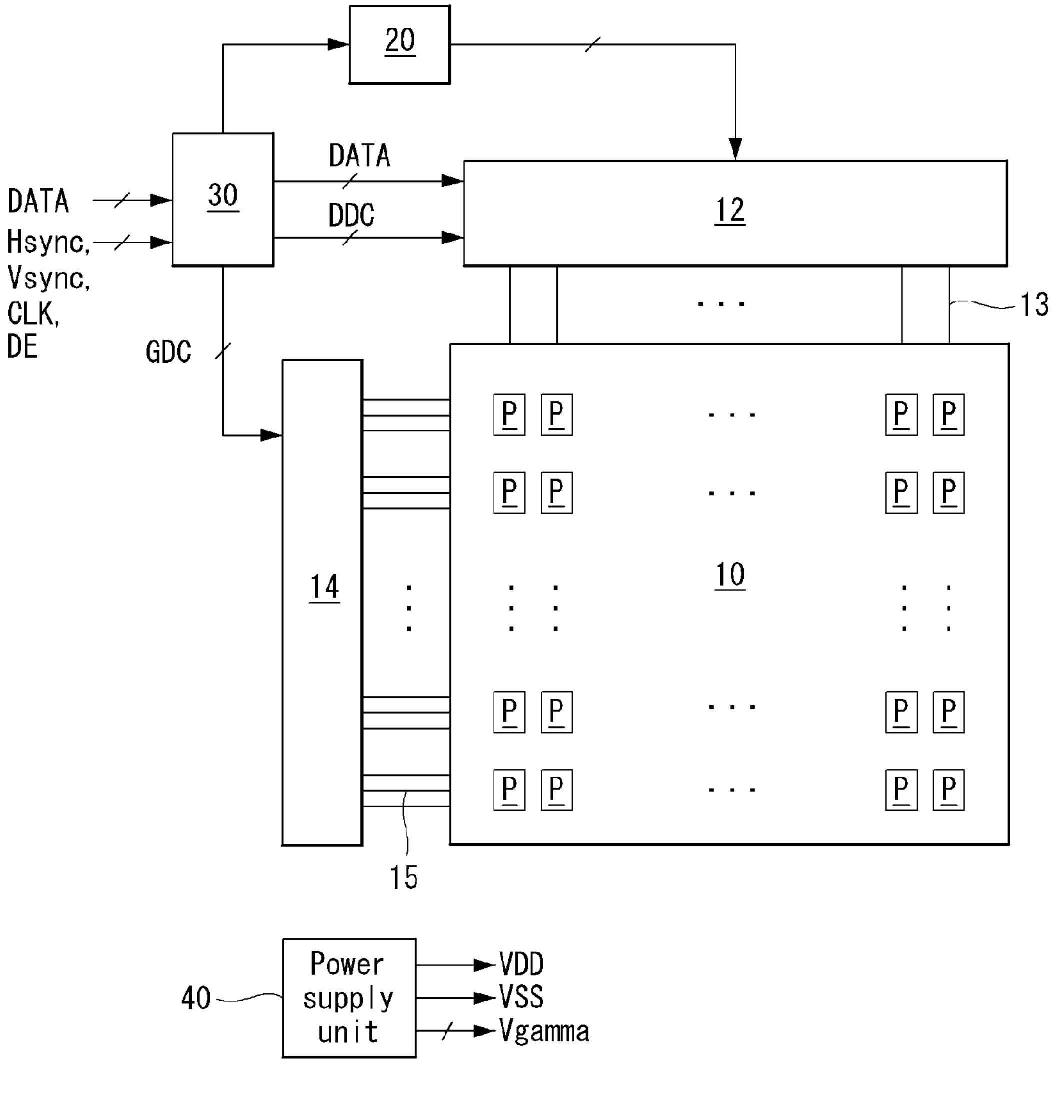
FIG. 9 is a block diagram of an organic light emitting diode display according to an exemplary embodiment of the invention.

FIG. 1 shows a driving characteristic compensation device in an organic light emitting diode display according to an exemplary embodiment of the invention. FIG. 9 is a block diagram of an organic light emitting diode display according to an exemplary embodiment of the invention.

As shown in FIG. 1, a driving characteristic compensation device according to an exemplary embodiment of the invention includes pixels P, a sensing unit 110, a data compensation unit 20, an adjustment unit 100 of a low potential power voltage VSS (hereinafter, abbreviated to "VSS adjustment unit"), and the like.

As shown in FIG. 9, the pixels P are arranged on a display panel 10 of an organic light emitting diode display according to the embodiment of the invention in a matrix form and display data of an input image. Each pixel P includes an organic light emitting diode (OLED), a first thin film transistor (TFT) ST, a second TFT DT, a capacitor C, and the like as shown in FIG. 1. The pixels P are not limited to a structure shown in FIG. 1. The pixels P may use pixels of any of known organic light emitting diode displays. Organic compound layers including a hole injection layer HIL, a hole transport layer HTL, an emission layer EML, an electron transport layer ETL, an electron injection layer EIL, etc., may be stacked between an anode terminal and a cathode terminal of the OLED. The first TFT ST applies a data voltage from a data line 13 to a gate of the second TFT DT in response to a scan pulse SCAN from a gate line 15. The second TFT DT is a driving TFT controlling a current flowing in the OLED depending on the data voltage. A high potential power voltage VDD of the pixel is applied to a drain of the second TFT DT. The capacitor C is connected between the gate and the source of the driving TFT DT. The anode terminal of the OLED is connected to the source of the second TFT DT. The low potential power voltage VSS is applied to the cathode terminal of the OLED.

The low potential power voltage VSS is generated at a negative voltage (−V) in a sensing mode by the VSS adjustment unit 100 and is generated at a ground level voltage GND in a driving mode by the VSS adjustment unit 100. The ground level voltage GND may be zero volt, but may vary depending on a system.

In the sensing mode, the data of an input image is not applied to the pixel P, and changes in driving characteristic of the pixel P are sensed. The sensing mode may be assigned before and after the driving mode. In the driving mode, the data voltage of the input image is supplied to the pixel P, and the data of the input image is displayed on the pixel P.

The sensing unit 110 includes a first switch S1, a comparator 111, an analog-to-digital converter (ADC) 112, and an offset compensation unit 113.

The first switch S1 is connected between the anode terminal of the OLED and the comparator 111. In the sensing mode, the first switch S1 is turned on and supplies an anode voltage of the OLED to a non-inverting input terminal (+) of the comparator 111. A predetermined reference voltage Vref is supplied to an inverting input terminal (−) of the comparator 111. The comparator 111 supplies a difference between the anode voltage of the OLED and the predetermined reference voltage Vref to the ADC 112. The comparator 111 senses changes in the driving characteristic of the pixel P, which increases to a value greater than the reference voltage Vref.

The ADC 112 converts the voltage input from the comparator 111 into digital data. When the ADC 112 outputs 10-bit digital data, a sensing range of the ADC 112 is divided into 1024 stages.

In the sensing mode, the offset compensation unit 113 adds an offset value, which is set to a value corresponding to a lower adjustment width of the low potential power voltage VSS, to an output of the ADC 112. In the embodiment disclosed herein, the lower adjustment width of the low potential power voltage VSS means a difference between the ground level voltage GND and the negative voltage (−V). For example, when the VSS adjustment unit 100 adjusts the low potential power voltage VSS to "−1V" less than the ground level voltage GND, the offset compensation unit 113 adds the offset value corresponding to "1V" to the output of the ADC 112 and then outputs a compensation value.

The data compensation unit 20 adds and subtracts or multiplies the compensation value input from the offset compensation unit 113 to and from or by digital video data of the input image and compensates for the driving characteristic of the pixel P. The digital video data modified by the data compensation unit 20 is input to a digital-to-analog converter (DAC) 114. The DAC 114 converts the digital video data input from the data compensation unit 20 into a gamma compensation voltage and generates the data voltage. The data voltage is applied to the pixel P through the data line 13 (refer to FIG. 9).

In the sensing mode, the VSS adjustment unit 100 reduces the low potential power voltage VSS to the negative voltage (−V) considering that the changes in the driving characteristic of the pixel P exceed the sensing range of the ADC 112 as the usage environment changes or the usage time passed. In the driving mode, the VSS adjustment unit 100 increases the low potential power voltage VSS to the ground level voltage GND. For this, the VSS adjustment unit 100 includes a second switch S2 for supplying the ground level voltage GND to the cathode terminal of the OLED in the driving mode and a third switch S3 for supplying the negative voltage (−V) to the cathode terminal of the OLED in the sensing mode.

Figure 2:
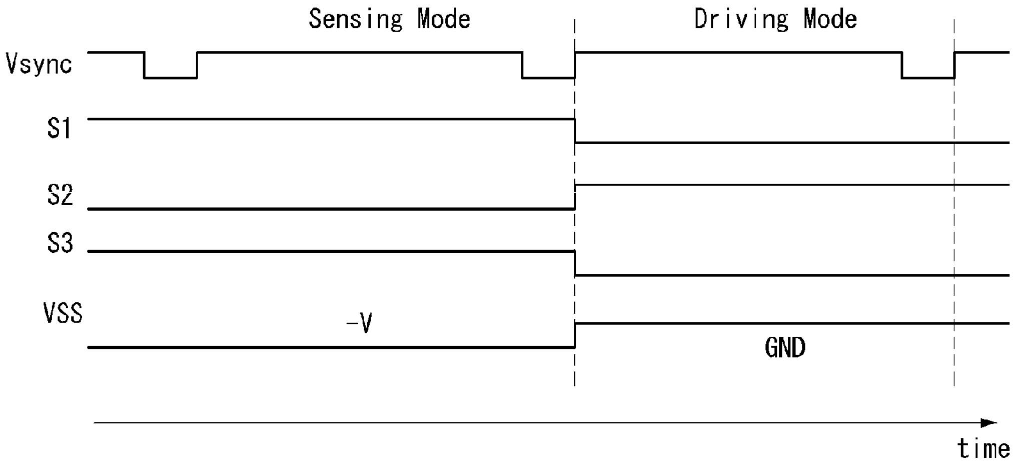
FIGS. 2 and 3 are waveform diagrams showing a sensing mode and a driving mode of an organic light emitting diode display according to an exemplary embodiment of the invention.
Figure 2:
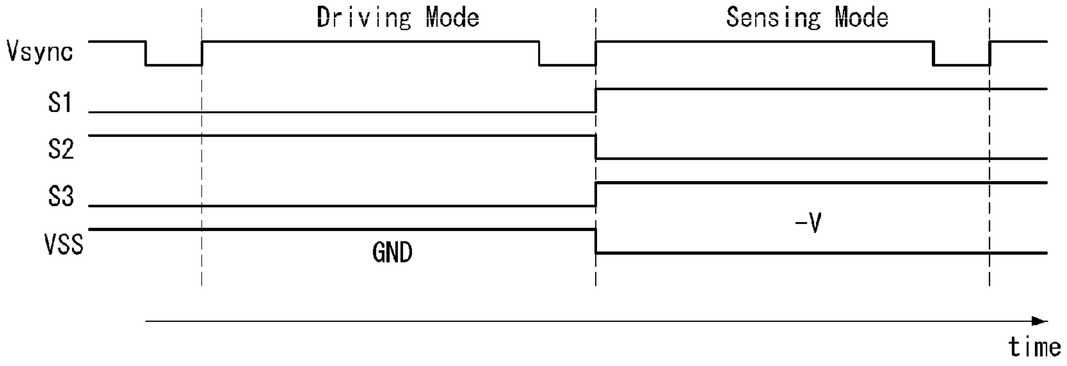
Figure 3:
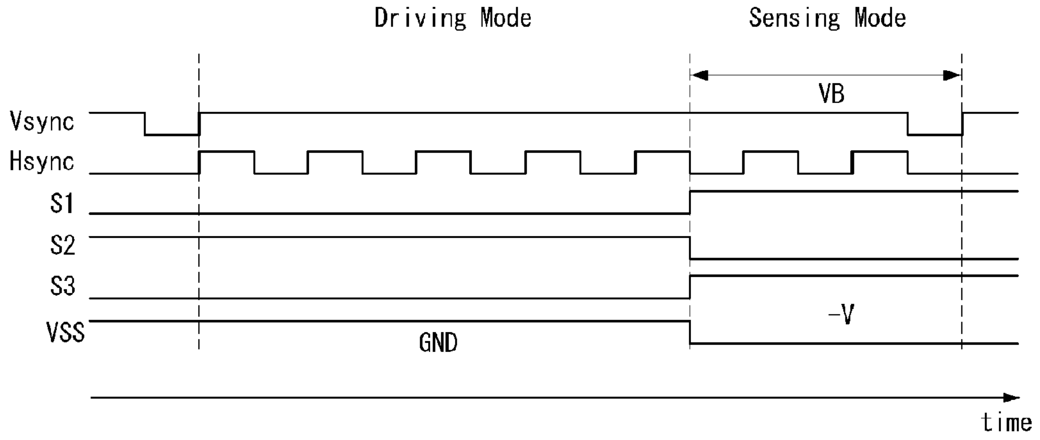
Figure 4:
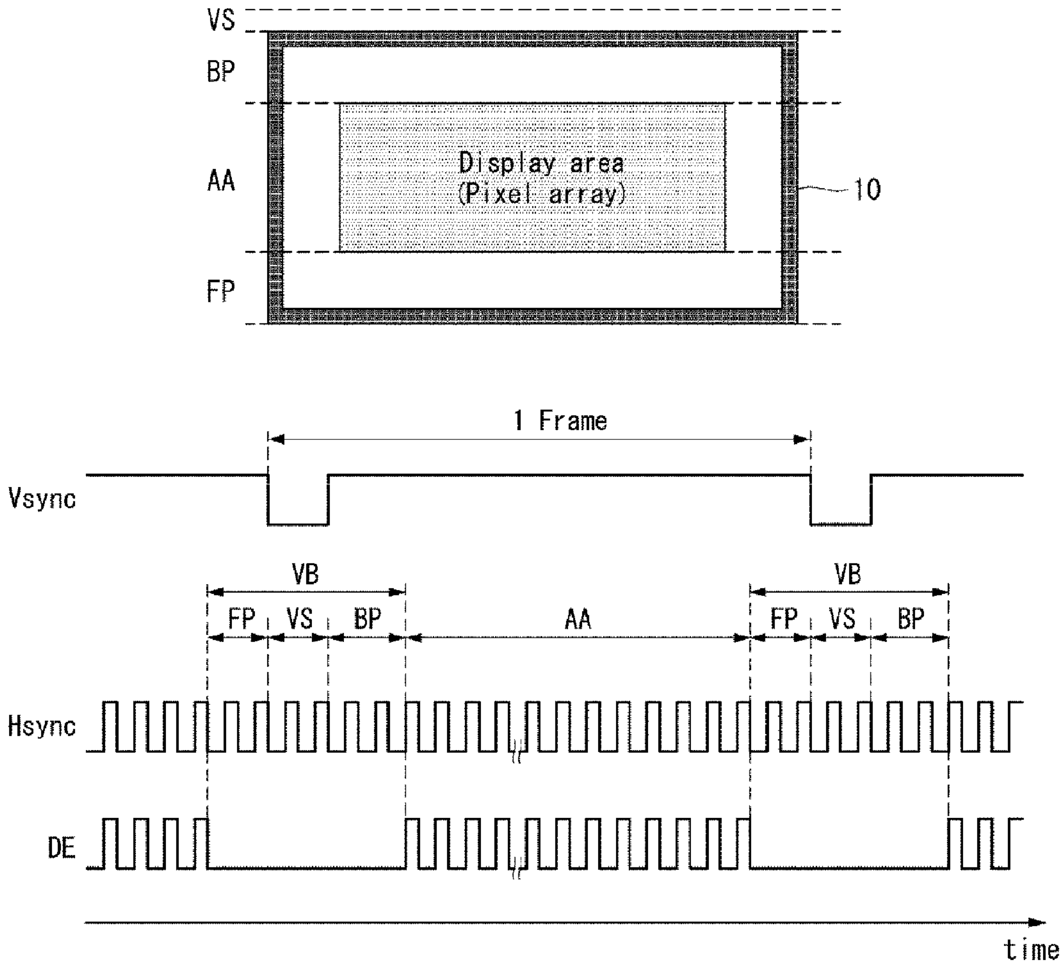
FIG. 4 is a waveform diagram showing display timing based on a video electronics standards association (VESA)

FIGS. 2 and 3 are waveform diagrams showing the sensing mode and the driving mode of the organic light emitting diode display according to the embodiment of the invention. FIG. 4 is a waveform diagram showing display timing based on a video electronics standards association (VESA).

As shown in FIGS. 2 to 4, the sensing mode may sense the driving characteristics of the pixels P before and after the driving mode and may sense the driving characteristics of the pixels P in a vertical blank period VB. The vertical blank period VB is a period, in which there is no data enable signal DE between an Nth frame period and an (N+1)th frame period, where N is a positive integer. The data enable signal DE is synchronized with the data of the input image to be displayed on the pixels P of the display panel 10. The data of the input image is not input in the vertical blank period VB.

In the sensing mode, the first and third switches S1 and S3 are turned on, the anode terminal of the OLED is connected to the non-inverting input terminal (+) of the comparator 111, and the low potential power voltage VSS applied to the cathode terminal of the OLED is reduced to the negative voltage (−V). In the sensing mode, the second switch S2 maintains a turn-off state.

In the driving mode, the first and third switches S1 and S3 are turned off, and the second switch S2 is turned on. Hence, a current path between the anode terminal of the OLED and the comparator 111 is cut off, and the low potential power voltage VSS applied to the cathode terminal of the OLED is adjusted to the ground level voltage GND. In the driving mode, the data voltage of the input image is supplied to the pixels P.

The turn-on and turn-off timings of the first to third switches S1 to S3 may be controlled by a timing controller 30 shown in FIG. 9.

One cycle of a vertical sync signal Vsync is one vertical period and defines timing of one frame period. One cycle of each of a horizontal sync signal Hsync and the data enable signal DE is one horizontal period. A high logic period (i.e., a pulse width) of the data enable signal DE indicates data timing of one line. One horizontal period is a horizontal address time required to apply data to the pixels on one line of the display panel 10.

The data enable signal DE and the data of the input image are input during a data enable period AA and are not input during the vertical blank period VB. The data enable period AA is a vertical address time required to display pixel data corresponding to one frame on all of the pixels included in a pixel array.

The vertical blank period VB includes a vertical sync time VS, a vertical front porch FP, and a vertical back porch BP.

The vertical sync time VS is a time ranging from a falling edge to a rising edge of the vertical sync signal Vsync and indicates a start (or an end) timing of one screen. The vertical front porch FP is a time ranging from a falling edge of a last pulse of the data enable signal DE indicating data timing of a last line of one frame data to a state time point of the vertical blank period VB. The vertical back porch BP is a time ranging from an end time point of the vertical blank period VB to a rising edge of a first pulse of the data enable signal DE indicating data timing of a first line of one frame data.

When the sensing range of the ADC 112 is 2V and the ADC 112 outputs 10-bit digital data, the ADC 112 converts a range (for example, 1V to 3V) of 2V into digital values of 1024 stages. If the reference voltage Vref of the comparator 111 is 1V, the driving characteristic of the pixel may be accurately sensed when the anode voltage (between 1V and 3V) of the OLED is input to the ADC 112. However, when the anode voltage of the OLED increases to 4V as the usage environment changes or the usage time passed, the anode voltage of the OLED exceeds the sensing range of the ADC 112. Therefore, the ADC 112 outputs the digital data value "1024" corresponding to "2V". As a result, the related art senses the anode voltage of the OLED sensed by the ADC as "2V" when the anode voltage of the OLED is 4V. On the other hand, the embodiment of the invention reduces the low potential power voltage VSS of the pixel P to the negative voltage (−V) in the sensing mode, thereby accurately sensing changes in the driving characteristic of the pixel even when the changes in the driving characteristic of the pixel exceed the sensing range of the ADC 112.

Figure 5:
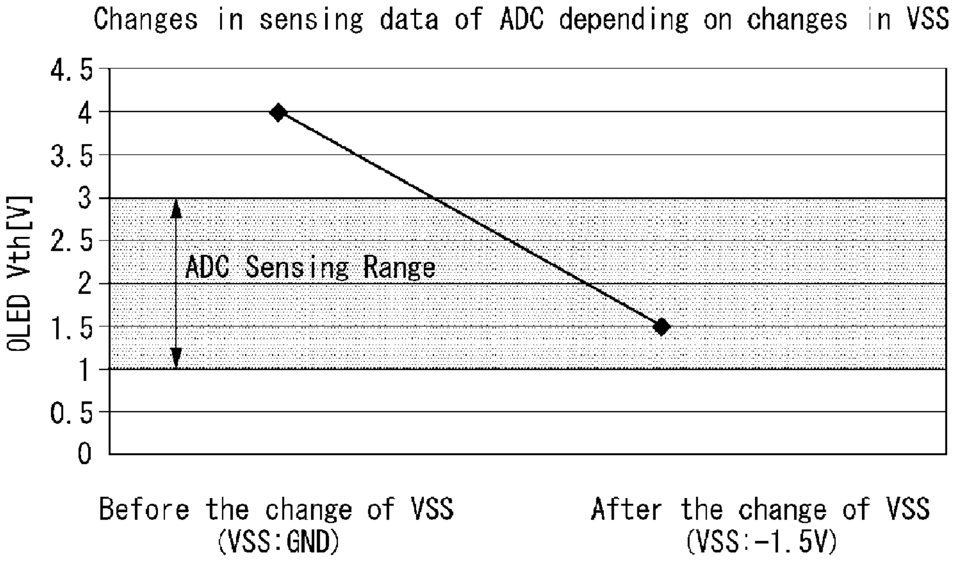
FIGS. 5 and 6 show a comparison between an exemplary embodiment of the invention and a related art when exceeding a sensing range of an analog-to-digital converter (ADC)
Figure 6:
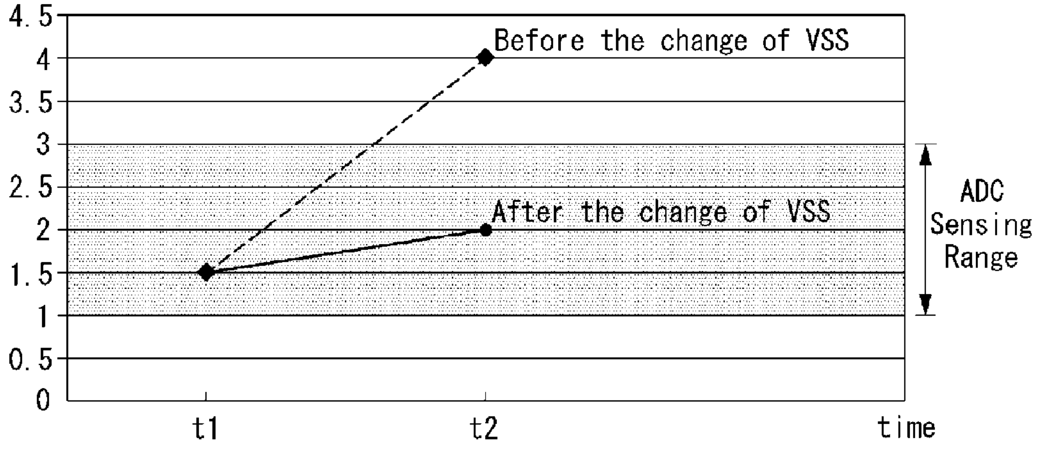

FIGS. 5 and 6 show a comparison between an exemplary embodiment of the invention and a related art when exceeding a sensing range of an analog-to-digital converter (ADC). For example, when the sensing range of the ADC 112 is 2V, the reference voltage Vref of the comparator 111 is 1V, and the anode voltage of the OLED is 4V, the anode voltage of the OLED is reduced by the low potential power voltage VSS (=−2.5V) and is 1.5V as shown in FIGS. 5 and 6 when the low potential power voltage VSS of −2.5V is applied. Because an input voltage of the ADC 112 is 1.5V, the input voltage of the ADC 112 is adjusted to a value within the sensing range. The ADC 112 outputs the anode voltage (=1.5V) of the OLED as the digital value. The offset compensation unit 113 adds the offset value of 2.5V to an output of the ADC 112. As a result, even if the anode voltage of the OLED exceeds the sensing range of the ADC 112, the sensing unit 110 may accurately sense the anode voltage of the OLED.

In the sensing mode, the embodiment of the invention senses changes in the anode voltage of the OLED and compares the changes in the anode voltage with a previously determined initial value, thereby estimating changes in the driving characteristic of the pixel P including changes in the threshold voltage of the OLED, changes in the threshold voltage of the driving TFT, changes in the mobility of the driving TFT, etc., based on the result of a comparison. Examples of a method for sensing the changes in the driving characteristic of the pixel P based on the changes in the anode voltage of the OLED are disclosed in Korean Patent Application No. 10-2013-0035184 (Apr. 1, 2013), Korean Patent Application No. 10-2013-0104341 (Aug. 30, 2013), and U.S. patent application Ser. No. 14/132,783 (Dec. 17, 2013) corresponding to the present applicant, and which are hereby incorporated by reference in their entirety.

The VSS adjustment unit 100 may adjust the negative voltage (−V) generated in the sensing mode depending on a location of the pixel and/or the elapse of time using a plurality of external negative voltage sources each having a different voltage level.

Figure 7:
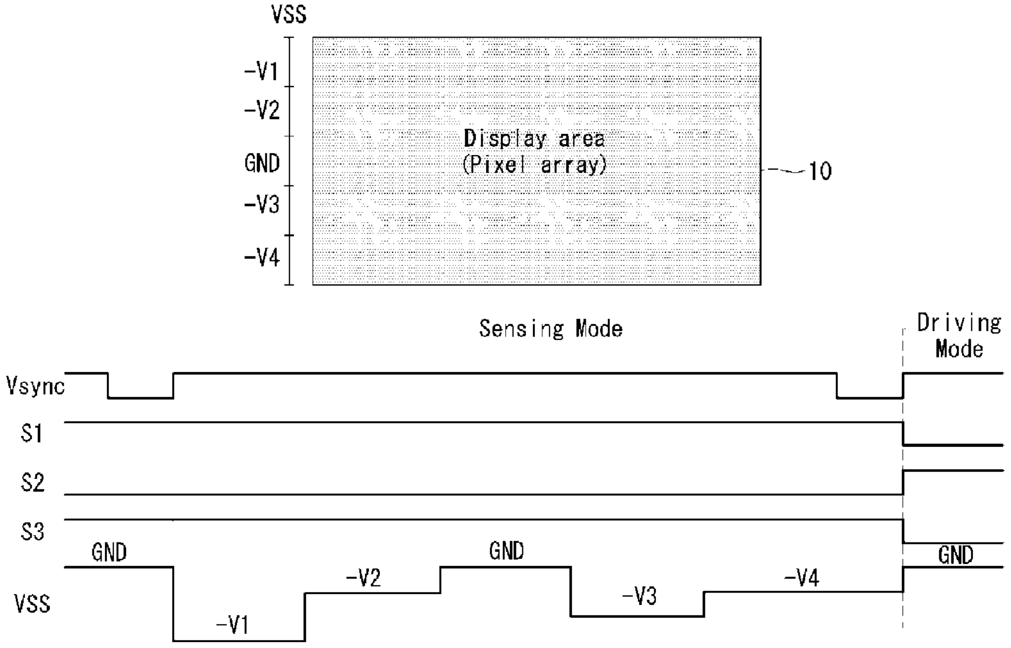
FIG. 7 shows an example of varying a low potential power voltage depending on a location of a pixel of a display panel.

FIG. 7 shows an example of varying a low potential power voltage depending on a location of a pixel of a display panel. As shown in FIG. 7, the low potential power voltage VSS may be differently applied depending on the location of the pixel on the display panel 10. For example, the embodiment of the invention divides the pixel array of the display panel 10 into a plurality of blocks and individually applies the low potential power voltage VSS to the blocks in consideration of a driving characteristic deviation of the pixels P.

Figure 8:
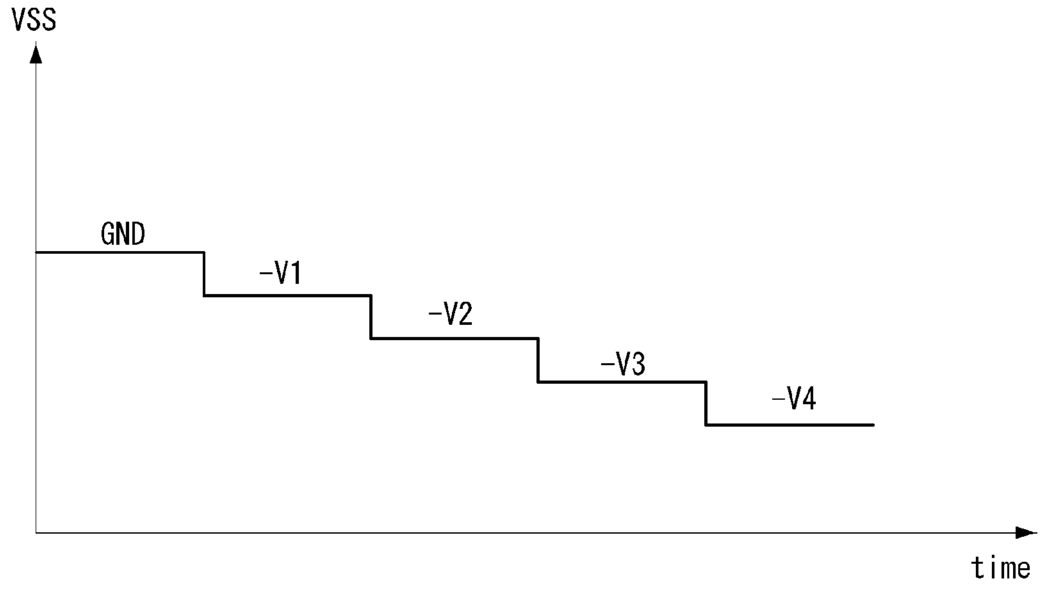
FIG. 8 shows an example of varying a low potential power voltage as time passed.

The changes in the driving characteristic of the pixel P may further increase as usage time of the organic light emitting diode display increases. Considering this, as shown in FIG. 8, the low potential power voltage VSS may be gradually reduced through the VSS adjustment unit 100 as time passed. In this instance, the offset compensation unit 113 may vary the offset value to be added to the output of the ADC 11 on a time axis depending on an adjustment width of the low potential power voltage VSS FIG. 9 is a block diagram of the organic light emitting diode display according to the embodiment of the invention.

As shown in FIG. 9, the organic light emitting diode display according to the embodiment of the invention includes the display panel 10, a display panel driving circuit, and a power supply unit 40.

The data of the input image is displayed on the pixel array of the display panel 10. The pixel array of the display panel 10 includes the plurality of data lines 13, the plurality of scan lines 15 crossing the data lines 13, and the plurality of pixels P arranged in a matrix form. Each pixel P may include a red subpixel R, a green subpixel G, and a blue subpixel B for the color representation. Further, each pixel P may include a red subpixel R, a green subpixel G, a blue subpixel B, and a white subpixel W for the color representation.

The display panel driving circuit includes a data driving circuit 12, a scan driving circuit 14, the data compensation unit 20, the sensing unit 110, and the timing controller 30. The display panel driving circuit applies the data of the input image to the pixel array of the display panel 10. The data compensation unit 20 may be embedded in the timing controller 30 or the data driving circuit 12.

The first switch S1 of the sensing unit 110 may be embedded in the pixel P. The second and third switches S2 and S3 of the VSS adjustment unit 100 may be embedded in the power supply unit 40. The comparator 111, the ADC 112, the offset compensation unit 113, and the DAC 114 may be embedded in the data driving circuit 12. Since the sensing unit 110 and the data compensation unit 20 are described in detail above, a further description may be briefly made or may be entirely omitted.

The data driving circuit 12 converts digital video data DATA of the input image input from the data compensation unit 20 into an analog gamma compensation voltage Vgamma using the DAC 114 and generates the data voltage. The data driving circuit 12 then outputs the data voltage to the data lines 13. The data driving circuit 12 may transmit the compensation value for compensating for changes in the driving characteristic of each pixel P sensed by the sensing unit 110 to the data compensation unit 20 through the timing controller 30.

The scan driving circuit 14 supplies a scan pulse (or a gate pulse) synchronized with an output voltage of the data driving circuit 12 to the scan lines 15 under the control of the timing controller 30 during the data enable period AA. The scan driving circuit 14 may generate control signals of the switches S1 to S3 under the control of the timing controller 30.

The timing controller 30 receives the digital video data DATA of the input image and timing signals synchronized with the digital video data DATA from a host system (not shown). The timing signals include a vertical sync signal Vsync, a horizontal sync signal Hsync, a data enable signal DE, a dot clock CLK, and the like. The timing controller 30 generates timing control signals DDC and GDC for respectively controlling operation timings of the data driving circuit 12 and the scan driving circuit 14 based on the timing signals Vsync, Hsync, DE, and CLK.

The host system may be implemented as one of a television system, a set-top box, a navigation system, a DVD player, a Blu-ray player, a personal computer (PC), a home theater system, and a phone system.

When an input voltage from the host system is supplied to the power supply unit 40, the power supply unit 40 generates the high potential power voltage VDD, the low potential power voltage VSS, and the gamma compensation voltage Vgamma of the pixel. The power supply unit 40 varies the low potential power voltage VSS in the sensing mode and the driving mode using the VSS adjustment unit 100.

The embodiments of the invention adopt the external compensation technology for accurately sensing the changes in the driving characteristic of each pixel to compensate for the changes in the driving characteristic of each pixel based on the sensing result, thereby increasing the yield and the lifespan of the organic light emitting diode display. Further, the embodiments of the invention omit or minimize an internal compensation circuit in the pixel through the external compensation technology, thereby simplifying the structure of the pixels and increasing an aperture ratio and the yield of the pixels. The embodiments of the invention reduce the low potential power voltage VSS of the pixel to the negative voltage in the sensing mode and accurately sense the changes in the driving characteristic of the pixel exceeding the sensing range of the ADC.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An organic light emitting diode display, comprising:

a low potential power voltage adjustment circuit that applies a negative voltage to a cathode terminal of an organic light emitting diode (OLED) as a low potential power voltage in a sensing mode and applies a ground voltage to the cathode terminal as the low potential power voltage in a driving mode, wherein data voltages of an input image are supplied to pixels each including the OLED in the driving mode and changes in driving characteristics of the pixels are sensed in the sensing mode; and a sensing circuit that senses an anode voltage of the OLED using an analog-to-digital converter in the sensing mode.

2. The organic light emitting diode display of claim 1, further comprising a data compensation circuit that compensates for the changes in the driving characteristics of the pixels by adding, subtracting or multiplying a compensation value input from the sensing circuit to, from or by data of the input image.

3. The organic light emitting diode display of claim 1, wherein the sensing circuit includes:

a first switch connected to an anode terminal of the organic light emitting diode;

a comparator, connected between the first switch and the analog-to-digital converter, supplying a difference between the anode voltage of the OLED and the ground level voltage to the analog-to-digital converter in the sensing mode; and an offset compensation circuit that adds a difference between the ground level voltage and the negative voltage, to an output of the analog-to-digital converter in the sensing mode.

4. The organic light emitting diode display of claim 3, wherein the low potential power voltage adjustment circuit includes:

a second switch configured to supply the ground level voltage to the cathode terminal of the OLED in the driving mode; and a third switch configured to supply the negative voltage to the cathode terminal of the OLED in the sensing mode.

5. The organic light emitting diode display of claim 1, wherein the low potential power voltage adjustment circuit adjusts the low potential power voltage to be applied to the cathode terminal of the OLED in the sensing mode based on a location of the pixels.

6. The organic light emitting diode display of claim 1, wherein the low potential power voltage adjustment circuit adjusts the low potential power voltage to be applied to the cathode terminal of the OLED in the sensing mode to be smaller as time passes.

7. The organic light emitting diode display of claim 1, wherein the negative voltage is adjusted as time passes in response to the changes in a driving characteristic of the pixel including the organic light emitting diode.

8. A method for sensing driving characteristics of an organic light emitting diode display, the method comprising:

adjusting a low potential power voltage to be applied to a cathode terminal of an organic light emitting diode (OLED) to a negative voltage in a sensing mode in which changes in driving characteristics of the pixels are sensed;

adjust the low potential power voltage to a ground level voltage in a driving mode in which data voltages of an input image are supplied to pixels each including the OLED; and sensing an anode voltage of the OLED using an analog-to-digital converter in the sensing mode.

9. The method of claim 8, wherein the adjusting of the low potential power voltage of the pixels to the negative voltage in the sensing mode includes adjusting the low potential power voltage to be applied in the sensing mode based on a location of the pixels.

10. The method of claim 8, wherein the adjusting of the low potential power voltage of the pixels to the negative voltage in the sensing mode includes adjusting the low potential power voltage to be applied in the sensing mode to be smaller as time passes.

11. The method of claim 8, wherein the negative voltage is adjusted as time passes in response to the changes in a driving characteristic of the pixel including the organic light emitting diode.

12. An organic light emitting diode display, comprising:

a display panel driving circuit supplying a data voltage of an input image to a pixel including an organic light emitting diode (OLED) in a driving mode and sensing a driving characteristic of the pixel in a sensing mode;

a power supply circuit that generates one or more voltages including a low potential power voltage to supply to the display panel; and a low potential power voltage adjustment circuit that applies a negative voltage to a cathode terminal of the OLED as the low potential power voltage in the sensing mode and applies a ground level voltage to the cathode terminal of the OLED as the low potential power voltage in the driving mode, wherein the display panel driving circuit includes a sensing circuit that senses an anode voltage of the OLED in the sensing mode and a data compensation circuit that modifies the data voltage based on the driving characteristic of the pixel.

13. The organic light emitting diode display of claim 12, wherein the data compensation circuit compensates for changes in the driving characteristic of the pixel by adding, subtracting or multiplying a compensation value input from the sensing circuit to, from or by data of the input image.

14. The organic light emitting diode display of claim 12, wherein the sensing circuit includes:

a first switch connected to an anode terminal of the OLED;

a comparator, connected between the first switch and the analog-to-digital converter, outputting a difference between the anode voltage of the OLED and the ground level voltage to the analog-to-digital converter in the sensing mode; and an offset compensation circuit that adds a difference between the ground level voltage and the negative voltage to an output of the analog-to-digital converter in the sensing mode.

15. The organic light emitting diode display of claim 14, wherein the low potential power voltage adjustment circuit includes:

a second switch supplying the ground level voltage to the cathode terminal of the OLED in the driving mode; and a third switch supplying the negative voltage to the cathode terminal of the OLED in the sensing mode.

16. The organic light emitting diode display of claim 12, wherein the low potential power voltage adjustment circuit adjusts the low potential power voltage to be applied to the cathode terminal of the OLED in the sensing mode based on a location of the pixel.

17. The organic light emitting diode display of claim 12, wherein the low potential power voltage adjustment circuit adjusts the low potential power voltage to be applied to the cathode terminal of the OLED in the sensing mode to be smaller as time passes.

* * * * *